United States Patent [19]
Nakajima

[11] Patent Number: 5,557,336
[45] Date of Patent: Sep. 17, 1996

[54] VIDEO RECORDING AND/OR REPRODUCING APPARATUS THAT RECORDS A SIGNAL INDICATING ASPECT RATIO

[75] Inventor: Yasuhisa Nakajima, Kanagawa, Japan

[73] Assignee: Sony Corporation, Tokyo, Japan

[21] Appl. No.: 424,592

[22] Filed: May 26, 1995

Related U.S. Application Data

[62] Division of Ser. No. 191,763, Feb. 3, 1994, Pat. No. 5,455,631, which is a continuation of Ser. No. 861,029, Mar. 31, 1992, abandoned.

[30] Foreign Application Priority Data

Apr. 4, 1991 [JP] Japan .................................. 3-071849

[51] Int. Cl.⁶ ...................................................... H04N 5/46
[52] U.S. Cl. .......................... 348/556; 348/478; 358/335
[58] Field of Search .................................... 348/556, 478, 348/445, 460, 461, 465, 473, 476, 555, 558; 358/142, 147, 180, 146, 335, 342, 310; H04N 7/08, 7/087, 5/92, 5/91, 5/93, 5/46, 5/44

[56] References Cited

U.S. PATENT DOCUMENTS

| | | | |
|---|---|---|---|
| 4,394,690 | 7/1983 | Kobayashi | 348/556 |
| 5,008,749 | 4/1991 | Ruckert | 348/495 |
| 5,122,885 | 6/1992 | Yoshioka et al. | 358/310 |
| 5,389,975 | 2/1995 | Maeshima et al. | 348/556 |

FOREIGN PATENT DOCUMENTS

| | | |
|---|---|---|
| 402992 | 12/1990 | European Pat. Off. . |
| 250479 | 10/1990 | Japan . |
| 250478 | 10/1990 | Japan . |
| 238985 | 10/1991 | Japan . |

Primary Examiner—Safet Metjahic
Assistant Examiner—Chris Grant
Attorney, Agent, or Firm—Jay H. Maioli

[57] ABSTRACT

An apparatus for recording and reproducing a video signal having different aspect ratios on a record medium comprises a record circuit for recording the video signal on the record medium, a circuit for inserting an aspect ratio indicating signal which indicates the different aspect ratios in a vertical blanking period of the video signal, and a playback circuit for reproducing the video signal from the record medium, and a circuit for reproducing the aspect ratio indicating signal and controlling a display means in response to the aspect ratio indicating signal.

1 Claim, 3 Drawing Sheets

VIDEO RECORDING AND/OR REPRODUCING APPARATUS THAT RECORDS A SIGNAL INDICATING ASPECT RATIO

This is a division of application Ser. No. 08/191,763, filed Feb. 3, 1994, now U.S. Pat. No. 5,455,631, which was a continuation of application Ser. No. 07/861,029, filed Mar. 31, 1992, now abandoned.

BACKGROUND OF THE INVENTION

1. Field of the Invention

The present invention generally relates to apparatus for recording and/or reproducing a video signal and, more particularly is directed to a video recording and/or reproducing apparatus for use with a video tape recorder or the like.

2. Description of the Related Art

New television systems such as PAL plus, D2-MAC, EDTV-II and MUSE are being introduced today and the most specific feature of these new television systems lies in that a reproduced picture is displayed on a wide picture screen, i.e., a reproduced picture having a width-to-height ratio, i.e., an aspect ratio of 16:9 is displayed on the picture screen.

When a video signal according to this kind of television system is recorded on a magnetic tape by a video tape recorder (VTR), reproduced therefrom and then supplied to a television receiver so that a picture is reproduced on the picture screen of the television receiver, a signal indicating that such video signal is reproduced on the wide screen, i.e., an aspect ratio indicating signal must be recorded on the magnetic tape together with the video signal, otherwise a correct picture cannot be received and reproduced by the television receiver.

According to a conventional video tape recorder, such a proposal is made that an aspect ratio indicating signal is recorded on a magnetic tape together with a video signal by pulse-width-modulating (PWM) a trailing edge of a CTL (control) signal recorded in the longitudinal direction of a side edge of the magnetic tape.

Also, such a technique is known that a duty ratio of CTL signal recorded in the longitudinal direction of the side edge of the magnetic tape is varied in order to find out a starting portion of an event recorded on the magnetic tape in a high-speed search mode. Accordingly, the former proposed technique for recording the aspect ratio indicating signal by pulse-width-modulating the trailing edge of the CTL signal is not compatible with the latter technique for varying the duty ratio of the CTL signal and cannot be realized in actual practice.

OBJECTS AND SUMMARY OF THE INVENTION

Therefore, it is an object of the present invention to provide an improved video signal recording and/or reproducing apparatus in which the aforesaid shortcomings and disadvantages of the prior art can be eliminated.

More specifically, it is an object of the present invention to provide a video signal recording and/or reproducing apparatus in which an aspect ratio indicating signal indicating a width-to-height ratio of a reproduced picture of a video signal can be recorded together with the video signal and reproduced with ease although the kind of the signal format of the video signal is different.

It is another object of the present invention to provide a video signal recording and/or reproducing apparatus for use with a digital video tape recorder.

It is still another object of the present invention to provide a video signal recording and/or reproducing apparatus for use with an analog video tape recorder.

As an aspect of the present invention, an apparatus for recording a video signal having different aspect ratios on a record medium comprises a record circuit for recording the video signal on the record medium, and a circuit for inserting an aspect ratio indicating signal which indicates the kind of aspect ratio in a vertical blanking period of the video signal and recording the aspect ratio indicating signal on the record medium.

According to another aspect of the present invention, an apparatus for recording and reproducing a video signal having different aspect ratios on a record medium comprises a record circuit for recording the video signal on the record medium, a circuit for inserting an aspect ratio indicating signal which indicates the different aspect ratios in a vertical blanking period of the video signal, and a playback circuit for reproducing the video signal from the record medium, and a circuit for reproducing the aspect ratio indicating signal and controlling a display apparatus in response to the aspect ratio indicating signal.

BRIEF DESCRIPTION OF THE DRAWINGS

A better understanding of other objects, features, and advantages of the invention can be gained from a consideration of the following detailed description of the preferred embodiment thereof, in conjunction with the figures of the accompanying drawings, wherein.

DESCRIPTION OF THE PREFERRED EMBODIMENT

An embodiment of the present invention will now be described in detail with reference to FIG. 1. In this embodiment, the present invention is applied to a digital video tape recorder (digital VTR) which records and/or reproduces the NTSC or PAL video signal in which a reproduced picture has a width-to-height ratio (i.e., aspect ratio) of 4:3 and the PAL plus video signal in which a reproduced picture has a width-to-height ratio (i.e., aspect ratio) of 16:9.

The recording of a digital composite video signal will be described below.

Figure 1:
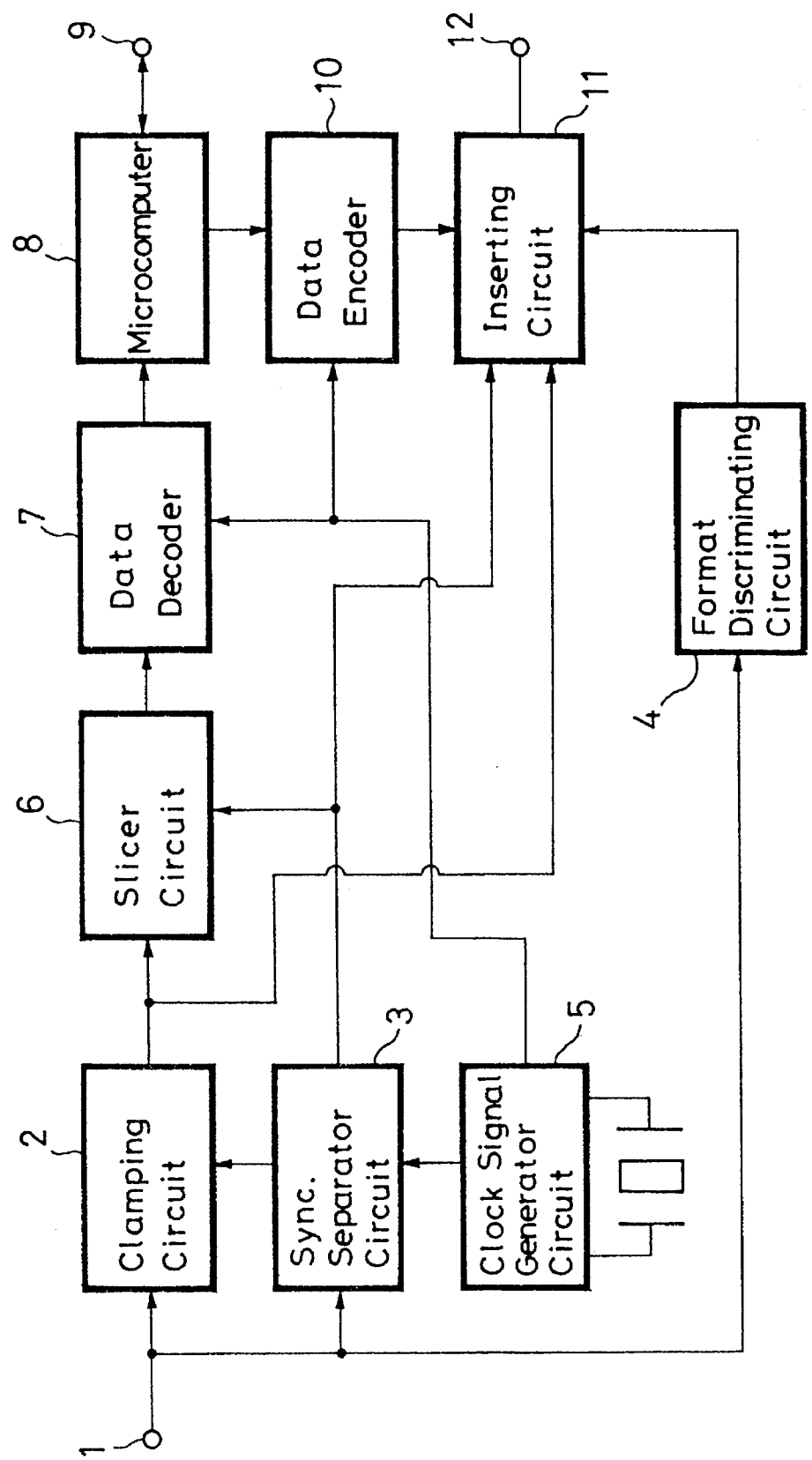
FIG. 1 is a block diagram showing an apparatus for recording and/or reproducing a video signal according to an embodiment of the present invention.

Referring to FIG. 1, a digital composite video signal applied to an input terminal 1 is commonly supplied to a clamping circuit 2, a synchronizing (sync.) separator circuit 3 and a format discriminating circuit 4. A clamped digital composite video signal from the clamping circuit 2 is supplied to an inserting circuit 11, and a clock signal of a predetermined frequency from a clock signal generator circuit 5 is supplied to the sync. separator circuit 3 and a data encoder 10. Digital horizontal and vertical sync. signals from the sync. separator circuit 3 are supplied to the inserting circuit 11. A discriminated output from the format discriminating circuit 4 is supplied to the inserting circuit 11. The data encoder 10 is controlled by a microcomputer 8. The data encoder 10 is constructed as shown in FIG. 2, in which discriminating data (serial data) having a clock run-in area indicative of an aspect ratio of 16:9 from the microcomputer 8 is supplied through an input terminal 15 to a serial-to-parallel (S/P) shift register 16, in which it is converted into parallel data on the basis of the clock signal from the clock signal generator circuit 5. Then, this parallel data is modulated by a phase shift keying (PSK) modulator 17 and supplied to an output terminal 18, from which it is delivered to the inserting circuit 11. Alternatively, the PSK modulator 17 might be replaced with a frequency shift keying (FSK) modulator or the like.

When the aspect ratio of the digital composite video signal applied to the input terminal 1 is 16:9 which is the aspect ratio of the PAL plus video signal, then such aspect ratio of 16:9 is identified by the format discriminating circuit 4 and a PSK signal corresponding to digital "1" is inserted into a predetermined portion of the vertical blanking period of the digital composite video signal clamped by the clamping circuit 2, e.g., the interval of 10H through 21H of the first field as an aspect ratio indicating signal from the data encoder 10. Also, when the aspect ratio of the digital composite video signal supplied to the input terminal 1 is 4:3, then such aspect ratio of 4:3 is identified by the discriminating circuit 4 and the PSK signal corresponding to digital "1" is not inserted into the predetermined portion of the vertical blanking period of the video signal as the aspect ratio indicating signal from the data encoder 10 by the inserting circuit 11. Alternatively, a PSK signal corresponding to digital "0" might be inserted into the predetermined portion of the vertical blanking period of the video signal as the aspect ratio indicating signal. A digital composite video signal from the inserting circuit 11 is supplied from an output terminal 12 to a record signal processing circuit (not shown), in which it is processed in a suitable signal processing fashion such as encoding, modulation or the like. Then, the signal thus processed is supplied to a rotary magnetic head, thereby being recorded on the magnetic tape so as to form slant tracks. Other record media such as a magnetic disc or the like might be used instead of the magnetic tape.

Let us describe the playback operation of how to reproduce the recorded signal which results from encoding and modulating the digital composite video signal having or not having the aspect ratio indicating signal recorded on the magnetic tape.

A reproduced digital composite video signal, which results from decoding and demodulating a signal reproduced from the magnetic tape by a reproduced signal processing circuit, though not shown, is commonly supplied from the input terminal 1 to the clamping circuit 2 and the sync. separator circuit 3. A reproduced digital composite video signal clamped by the clamping circuit 2 is supplied through the inserting circuit 11 and converted into an analog composite video signal by some suitable circuit (not shown) such as a digital-to-analog (D/A) converter or the like. This analog composite video signal is supplied to a television receiver not shown. The digital horizontal and vertical sync. signals from the sync. separator circuit 3 are supplied to the slicer circuit (i.e., line slicer) 6 that is used to extract addition data. The clock signal of predetermined frequency from the clock signal generator circuit 5 is supplied to the data decoder 7 and the reproduced digital composite video signal clamped by the clamping circuit 2 is supplied through the slicer circuit 6 to the data decoder 7.

Figures 2A, 2B:
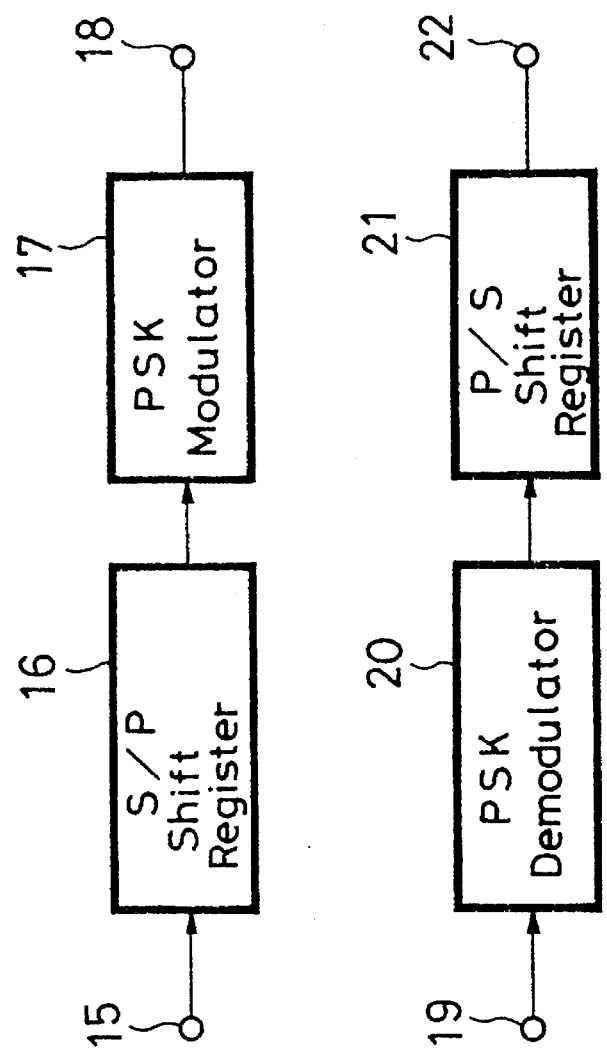
FIG. 2A is a block diagram showing a digital data encoder used in the present invention.
FIG. 2B is a block diagram showing a digital data decoder used in the present invention.

The data decoder 7 is constructed as shown in FIG. 2B, in which the output of the slicer circuit 6 is applied to an input terminal 19 and supplied to and demodulated by a PSK demodulator 20. A demodulated output (parallel data) from the PSK demodulator 20 is supplied to a parallel-to-serial (P/S) shift register 21, in which it is converted into serial data, which is fed from an output terminal 22 to the microcomputer 8 (see FIG. 1). It is determined by the microcomputer 8 on the basis of the serial data supplied thereto whether or not the reproduced digital composite video signal is a video signal such as the PAL plus video signal having the aspect ratio of 16:9. If it is determined by the microcomputer 8 that the reproduced digital composite video signal is the video signal having the aspect ratio of 16:9, then an aspect ratio control signal having an aspect ratio of 16:9 is delivered from the input and output terminal 9 of the microcomputer 8 and supplied to a deflection circuit or the like of the television receiver so that the television receiver is controlled so as to display a reproduced picture having an aspect ratio of 16:9. If on the other hand it is determined by the microcomputer 8 that the reproduced digital composite video signal is not the video signal having the aspect ratio of 16:9, then an aspect ratio control signal having an aspect ratio of 4:3 is output from the input and output terminal 9 of the microcomputer 8 and supplied to the deflection circuit or the like of the television receiver so that the television receiver is controlled so as to display a reproduced picture having an aspect ratio of 4:3.

When the digital composite video signal from the output terminal 12 is recorded and also converted into analog composite video signals, which are then supplied to and monitored by the television receiver, then the digital composite video signal from the input terminal 1 is commonly supplied to the clamping circuit 2 and the sync. separator circuit 3. The digital horizontal and vertical sync. signals from the sync. separator circuit 3 are supplied to the slicer circuit 6, and the clock signal of the predetermined frequency from the clock signal generator circuit 5 is supplied to the data decoder 7. The digital composite video signal clamped by the clamping circuit 2 is supplied through the slicer circuit 6 to the data decoder 7 which detects the aspect ratio indicating signal, and this aspect ratio indicating signal is supplied to the microcomputer 8. If it is determined by the microcomputer 8 that the reproduced digital composite video signal is a video signal such as the PAL plus video signal having the aspect ratio of 16:9, then an aspect ratio control signal having an aspect ratio of 16:9 is output from the input and output terminal 9 of the microcomputer 8 and then supplied to the deflection circuit or the like of the above television receiver so that the television receiver is controlled so as to display a reproduced picture having an aspect ratio of 16:9. If on the other hand it is not determined by the microcomputer 8 that the reproduced digital composite video signal is the video signal having the aspect ratio of 16:9, then an aspect ratio control signal having an aspect ratio of 4:3 is output from the input and output terminal 9 of the microcomputer 8 and then supplied to the deflection circuit or the like of the above television receiver so that the television receiver is controlled so as to display a reproduced picture having an aspect ratio of 4:3.

While the present invention is applied to the digital video tape recorder as described above, it is needless to say that the present invention is not limited to the digital video tape recorder and can also be applied to an analog video tape recorder. In this case, excepting for the difference between the digital and analog systems, the circuit shown in FIG. 1 is applied to the analog video tape recorder. However, the specific circuit configurations of the data encoder 10 and the data decoder 7 are different from those of the above-mentioned digital video tape recorder and therefore the specific arrangements of the data encoder 10 and the data decoder 7 used in the analog video tape recorder will be described below with reference to FIG. 3.

Figures 3A, 3B:
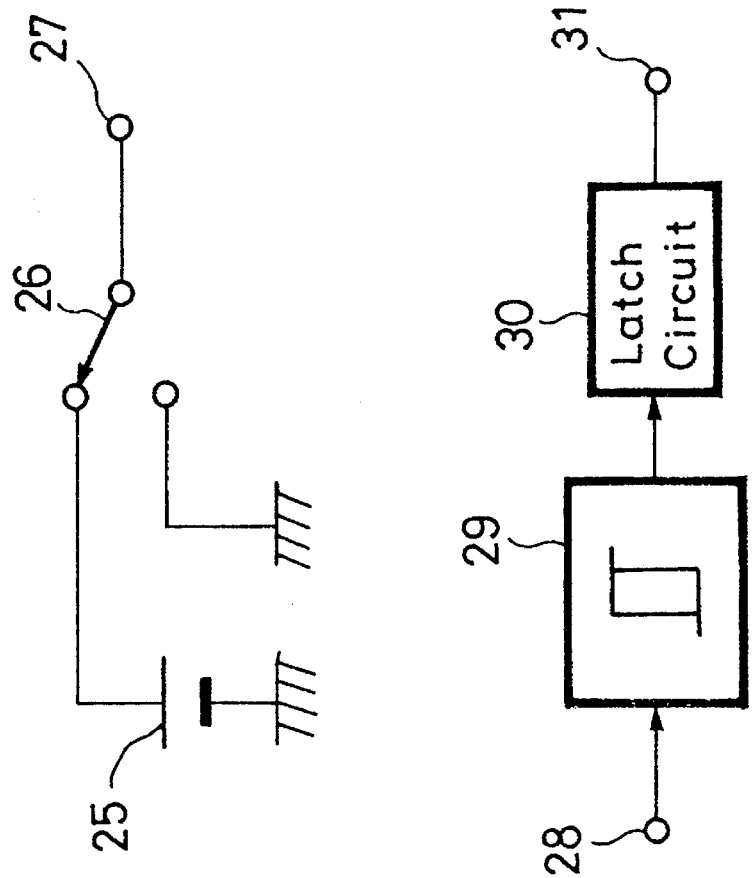
FIG. 3A is a block diagram showing an analog data encoder used in the present invention.
FIG. 3B is a block diagram showing an analog data decoder used in the present invention.

The analog data encoder 10 is constructed as shown in FIG. 3A. That is, as shown in FIG. 3A, a positive dc voltage of a dc voltage source 25 and the ground voltage are switched by a change-over switch 26 and then delivered from an output terminal 27. Thus, when the aspect ratio is 16:9, the data encoder 10 derives an aspect ratio indicating signal of white level, while when the aspect ratio is 4:3, then the data encoder 10 derives an aspect ratio indicating signal of black level. In this case, the change-over switch 26 is changed in position in response to the identified output from the format discriminating circuit 4 (see FIG. 1) and the format discriminating circuit 4 is inhibited from controlling the inserting circuit 11. When an analog composite video signal applied to the input terminal 1 is the PAL plus video signal having the aspect ratio of 16:9, then such signal format is identified by the format discriminating circuit 4 and the signal of white level is inserted into a predetermined portion of the vertical blanking period of the analog composite video signal clamped by the clamping circuit 2, e.g., the interval of 10H through 21H of the first field as the aspect ratio indicating signal by the inserting circuit 11. Further, when the aspect ratio of the analog composite video signal applied to the input terminal 1 is 4:3, then this signal format is identified by the format discriminating circuit 4 and the black level signal is inserted into the predetermined portion of the vertical blanking period of the analog composite video signal as the aspect ratio indicating signal from the data encoder 10 by the inserting circuit 11. The analog composite video signal from the inserting circuit 11 is supplied through the output terminal 12 to the record signal processing circuit (not shown), in which it is processed in a predetermined signal processing manner such as encoding and modulation. Then, the signal thus processed is supplied to the rotary magnetic head, thereby being recorded on the magnetic tape so as to form slant tracks.

Further, the analog data decoder 7 is constructed as shown in FIG. 3B, in which the output of the slicer circuit 6 from the input terminal 15 shown in FIG. 2A is supplied through an input terminal 28 to a Schmitt trigger circuit 29, in which it is converted into a binary value signal. An output of the Schmitt trigger circuit 29 is supplied to a latch circuit 30, in which it is latched in response to the clock signal from the clock signal generator circuit 5 and then delivered from an output terminal 31 to the microcomputer 8. It is determined by the microcomputer 8 on the basis of the output from the Schmitt trigger circuit 29 whether the reproduced analog composite video signal is the video signal such as the PAL plus video signal having the aspect ratio of 16:9 or the video signal such as the PAL or NTSC video signal having the aspect ratio of 4:3. If it is determined by the microcomputer 8 that the reproduced analog composite video signal is the video signal having the aspect ratio of 16:9, then the aspect ratio control signal having the aspect ratio of 16:9 is output from the input and output terminal 9 of the microcomputer 8 and then supplied to the deflection circuit or the like of the above-mentioned television receiver so that the television receiver is controlled so as to display a reproduced picture having an aspect ratio of 16:9. If on the other hand it is determined by the microcomputer 8 that the reproduced analog composite video signal is the video signal having the aspect ratio of 4:3, then the aspect ratio control signal having the aspect ratio of 4:3 is output from the input and output terminal 9 of the microcomputer 8 and then fed to the deflection circuit or the like of the above television receiver so that the television receiver is controlled so as to display a reproduced picture having an aspect ratio of 4:3.

According to the present invention, as set forth, since the aspect ratio indicating signal indicating the width-to-height ratio of the reproduced picture of the video signal is inserted into the vertical blanking period of the video signal, this video signal is recorded on and reproduced from the record medium and then the aspect ratio indicating signal is extracted from the reproduced video signal, the aspect ratio indicating signal can be recorded together with the video signal and extracted from the reproduced video signal with ease although the video signal has the different signal format.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. Recording and reproducing apparatus for respectively recording and reproducing on and from a recording medium a video signal having one of two possible aspect ratios, the apparatus comprising:

a clamping circuit, a sync separator circuit, a format discriminating circuit, a clock signal generator circuit, a slicer circuit, a data decoder, a microcomputer, a data encoder, and an inserting circuit, wherein:

a digital composite video signal is supplied to said clamping circuit, said sync separator circuit and said format discriminating circuit, said clamping circuit produces a clamped video signal output to said slicer circuit and said inserting circuit, said sync separator circuit produces a sync output signal to said slicer circuit and said inserting circuit, said format discriminating circuit produces a format discriminating output signal to said inserting circuit, said clock signal generator circuit produces a clock pulse output signal to said sync separator circuit, said data decoder and said data encoder, said slicer circuit produces an output to said data decoder, said data decoder produces an output to said microcomputer, said microcomputer produces an output to said data encoder, and said data encoder produces an output to said inserting circuit, and wherein:

said inserting circuit modifies said video signal as recorded in response to said format discriminating output signal so as to enable identification of the aspect ratio upon reproduction of said video signal, said slicer circuit during reproduction supplies an addition data output signal to said data decoder, said data decoder during reproduction decodes said addition data, said microcomputer during reproduction determines the aspect ratio of the reproduced signal, and said data encoder generates an aspect ratio indicating signal during recording.

\* \* \* \* \*